No. 754,265. Patented March 8, 1904.

UNITED STATES PATENT OFFICE.

JOHN A. WENDEL, OF MILWAUKEE, WISCONSIN.

MATCH COMPOSITION.

SPECIFICATION forming part of Letters Patent No. 754,265, dated March 8, 1904.

Application filed October 28, 1903. Serial No. 178,891. (No specimens.)

*To all whom it may concern:*

Be it known that I, JOHN A. WENDEL, a citizen of the United States, residing at Milwaukee, in the county of Milwaukee and State of Wisconsin, have invented a new and useful Composition of Matter, of which the following is a specification.

My invention relates to new and useful improvements in matches and the process of making the same; and its object is to provide a composition of matter whereby a match can be produced which will not taint objects placed in proximity thereto, which are non-poisonous, and will not ignite unless subjected to extreme friction.

A further object is to produce a match which is not easily affected by dampness, which produces a good flame, and which has disinfecting properties when lighted.

The composition consists of the following ingredients combined in the proportions stated: potassium chlorate, two; sulfid of antimony, one; lead nitrate, one; amorphous phosphorus, 0.5; vegetable carbon, 0.5; bichromate of potash, 0.3.

In preparing the mixture five parts of glue are boiled with thirty parts of water. The sulfid of antimony, lead nitrate, amorphous phosphorus, vegetable carbon, and bichromate of potash are then placed in a mortar in the proportions stated and are slowly mixed with a wooden spatula and finally pulverized by pressing lightly thereon with a clean glass pestle. The potassium chlorate is then pulverized and mixed with an equal quantity of the glue-water, and after it has been slowly stirred and a soft mixture produced the balance of the glue-water is added, and the mixture formed of the other ingredients is then added to it and thoroughly stirred, thereby producing a mixture of a greenish color. The match-splints are then dipped into the mixture and dried, after which they are ready for use. Matches formed in this manner can be transported practically without danger of ignition or explosion and will not be lighted unless subjected to considerable friction. Owing to the slight quantity of amorphous phosphorus contained in the mixture the matches are rendered practically harmless. Moreover, the matches will not easily ignite when stepped upon and are practically unaffected by a damp atmosphere. The ingredients are such as to act as a disinfectant when the matches are ignited.

Having thus described the invention, what is claimed as new is—

1. A composition of matter consisting of potassium chlorate, sulfid of antimony, lead nitrate, amorphous phosphorus, vegetable carbon, bichromate of potash, and a binding agent.

2. A composition of matter comprising potassium chlorate, sulfid of antimony, lead nitrate, amorphous phosphorus, vegetable carbon, bichromate of potash and glue.

3. A composition of matter prepared in the following proportions, potassium chlorate, two, sulfid of antimony, one, lead nitrate, one, amorphous phosphorus, 0.5, vegetable carbon, 0.5, bichromate of potash, 0.3, and glue.

In testimony whereof I affix my signature in presence of two witnesses.

JOHN A. WENDEL.

Witnesses:
 JACOB KEHREIN,
 LOUIS KOBLER.